Botos

United States Patent [19]

[11] Patent Number: 4,572,877
[45] Date of Patent: Feb. 25, 1986

[54] HERMETIC SEAL FOR AN ELECTROCHEMICAL CELL
[75] Inventor: Ernest D. Botos, Bay Village, Ohio
[73] Assignee: Union Carbide Corporation, Danbury, Conn.
[21] Appl. No.: 749,226
[22] Filed: Jun. 27, 1985
[51] Int. Cl.⁴ .............................................. H01M 2/12
[52] U.S. Cl. ..................................... 429/53; 429/174; 429/184; 429/194; 429/196
[58] Field of Search .................... 429/53, 56, 171, 174, 429/181, 185, 194, 196

[56] References Cited
U.S. PATENT DOCUMENTS

| | | | |
|---|---|---|---|
| 3,840,408 | 10/1974 | Bondley | 136/133 |
| 4,047,292 | 9/1977 | Shaffer | 29/630 |
| 4,115,629 | 9/1978 | Dey et al. | 429/56 |
| 4,233,372 | 11/1980 | Bro et al. | 429/174 |
| 4,279,975 | 6/1981 | Bowsky | 429/181 |
| 4,486,514 | 12/1984 | Chaney, Jr. | 429/56 |

FOREIGN PATENT DOCUMENTS 0061725  6/1982  European Pat. Off. .

Primary Examiner—Charles F. LeFevour
Attorney, Agent, or Firm—Roger Aceto

[57] ABSTRACT

The housing of an electrochemical cell system has a vent passageway defined by a flared flange. The flange is flared outwardly with respect to the longitudinal axis of the passageway so that the opening of the vent passageway facing to the interior of the housing is smaller than the opening of the vent passageway facing to the exterior of the housing. An electrically insulating material, such as glass, is fused in the passageway to form a hermetic seal. The outwardly flared flange facilitates removal of the seal material responsive to excessive internal cell pressures so the cell can be vented safely.

12 Claims, 3 Drawing Figures

HERMETIC SEAL FOR AN ELECTROCHEMICAL CELL

FIELD OF THE INVENTION

The present invention relates to a glass-to-metal (GTM) hermetic seal for an electrochemical cell system including means to facilitate the removal of the seal in a direction outwardly of the cell container in order to provide a vent when the pressure within the container reaches a predetermined level.

BACKGROUND OF THE INVENTION

Some electrochemical cells are housed in an open ended container having a flexible metal cover hermetically sealed to the open end. A terminal of the cell extends through the cover and is hermetically sealed to the cover by a glass or ceramic bead which is bonded to both the terminal and the cover.

It is important to maintain the integrity of the seal in order to keep the cell leakproof. The glass or ceramic is fragile and easily broken, especially when the terminal is subjected to an appreciable external force as may occur during the manufacturing of the cell or if it is dropped during handling or use. Since glass and ceramic are stronger in compression, the strength of the seal is improved by maintaining it under compression by the surrounding portion of the metal cover.

While the seal must resist fracture by an externally applied force, it is desirable that the seal be frangible in response to a build up of pressure within the cell in order to safely release such internal pressure. Failure to relieve the internal pressure could result in the disassembly of the component parts of the cell. This is particularly true in cell systems employing lithium, high vapor pressure organic solvents or inorganic cathode/solvent materials. These materials are highly reactive and corrosive and must be hermetically sealed in order to prevent exposure to the outside environment and to provide superior shelf life. Typical cell systems employing such highly reactive and corrosive materials include cell systems of lithium/oxyhalide, lithium/$MnO_2$, lithium/polycarbonfluoride, lithium/$TiS_2$ and lithium/$SO_2$.

It is desired that the hermetic seal open at a predetermined internal pressure in order to avoid the aforementioned possibility of the disassembly of the cell components. Moreover, it is desirable that the pressure range between the pressure required to provide a slight venting of the cell and the pressure required for a blow out of the seal be within a relatively narrow range. This will allow for removal of the seal and provide a relatively large vent opening should the pressure continue to rise after the opening of a small vent.

U.S. Pat. No. 4,115,629 discloses a cell closure comprising a flexible metal member having a vent opening of predetermined area spaced from the cell terminal. Over this opening a metallic disc of a size larger than the opening is symmetrically positioned and a glass or ceramic layer is hermetically bonded to the closure and to the disc. The structure of the bond is such that a predetermined gas build up within the cell will cause the vent to rupture thereby venting the gas from the cell. Rupture occurs when the internal pressure rise causes the closure to flex outwardly to the point where the effect of the flexure becomes great enough to produce a shear force sufficiently large to fracture the glass or the bond between the glass and the metal.

In U.S. Pat. Nos. 4,047,292 and 4,233,372 the metallic cover of the cell is provided with an opening and there is a flange about this opening which extends inwardly of the cell container. In the '372 patent, the flange extends generally parallel to the side wall of the container whereas in the '292 patent, the flange is flared so that the cross-sectional area of the opening on the inside of the container is larger than the cross sectional area at the exterior of the container.

European Patent Publication No. 61,725 discloses a hermetic seal for a cell including a flexible cover having a peripheral skirt sealed to the open end of the cell container and an inner disposed flange defining an opening through which protrudes the terminal of the cell. The terminal is hermetically sealed to the flange using a layer of glass or ceramic bonded to both the terminal and the flange. The flange in this European application extends substantially parallel to the wall of the container wherein flexing of the cover causes the hermetic seal to fail and break.

SUMMARY OF THE INVENTION

The present invention is characterized in one aspect thereof by an electrochemical cell system disposed in a housing comprising a container having an open end closed by a cover sealed in the open end and including means for venting the container responsive to a pressure build up in the cell, comprising (a) said housing having a flared flange which defines a longitudinally extending passageway having a first opening facing into said housing and a second opening facing to the exterior of said housing, said second opening being larger than said first opening, and (b) a glass hermetically sealed within said passageway.

Preferably the seal material is glass. However, where the term "glass" is used hereafter, it should be appreciated that this term is meant to encompass both ceramics such as alumina-containing materials and glasses such as borosilicate glass materials.

The glass in the passageway is such that it will fracture responsive to a pressure build up in said housing thereby allowing the gases within the housing to vent.

The passageway defined by the flared flange and the second opening of the passageway constitute the means to facilitate the outward direction and removal of fractured glass from the passageway. This insures that the passageway will remain open for properly venting the gases from the housing.

Preferably, the flared flange is located on the cover which closes the open end of the container. However, it can be at any convenient location such as on a side wall of the container or at its bottom.

In a miniature cell, the container and cover are made of relatively thin material which is less than 0.015 inch thick. To provide a surface area sufficient for a GTM seal for this thin material, the flared flange will be extended with respect to the housing. However, where the container and/or the cover are made of relatively thick material measuring 0.015 inch or more in thickness, the passageway can be formed by punching or otherwise machining a tapered bore through the material. In this thicker material the surface defining the tapered bore will provide an area sufficient for the GTM seal. Accordingly, as used herein, the term "flared flange" is intended to include a structure which defines a longitudinally extending passageway having a tapered profile defined by a wall thickness or an extended flange.

Whether the passageway is defined by a flange extending from the housing or by a punched or machined opening through the material, the important aspect is that the longitudinal passageway defined by the flared flange must have its larger opening facing to the exterior of the housing and its smaller opening facing into the housing. For example, where the flared flange is on the cover of the housing, it can extend upward or downward from the plane of the cover so long as the larger opening faces towards the exterior of the housing. This arrangement will provide the outward opening passageway needed to facilitate removal of the glass from the passageway when the glass fractures.

In a preferred embodiment, the flared flange defines a passageway through the cover of the housing and a cell terminal extends through the passageway. In this embodiment, the glass in the passageway forms a GTM hermetic seal within the flared flange and about the terminal.

Depending upon the material from which the container and/or cover is made, the thickness of the material, the relative expansion rates of the material and the glass, and the desired vent release pressure, the angle of the flare can vary. A small angle, as measured from the longitudinal axis of the passageway, will be sufficient to provide an appropriate flare to the passageway. However, for practical reasons engendered by manufacturing tolerances and techniques, it is preferred that the angle be no smaller than about 5°. At its largest extent, the angle of the flare can vary up to about 45°. An angle greater than about 45° is likely to decrease the compressive force exerted by the flange on the glass and decrease the mechanical strength of the GTM seal. A most useful range of flare is between about 5° and about 30° as measured from the longitudinal axis of the passageway. In this range venting can occur at internal pressures of between about 100 and about 200 psig.

In a preferred embodiment, the cover of the cell housing is a flat member where the flared flange is formed by turning a portion of the cover material from the plane of the cover. A cell terminal extends through the passageway defined by the flared flange and a borosilicate glass is fused in the passageway to form a GTM hermetic seal between the terminal and the cover. The cover also can be convex or concave but in either case, the flare of the flange is measured with respect to the longitudinal axis of the passageway. The cover preferably has a peripheral skirt to facilitate hermetically sealing the cover within the open end of the housing.

In another embodiment the flared flange can be located through the bottom or a wall of the housing.

The present invention will become more apparent upon consideration of the following detailed description thereof in conjunction with the accompanying drawings depicting the same.

DESCRIPTION OF PREFERRED EMBODIMENTS

Figure 1:
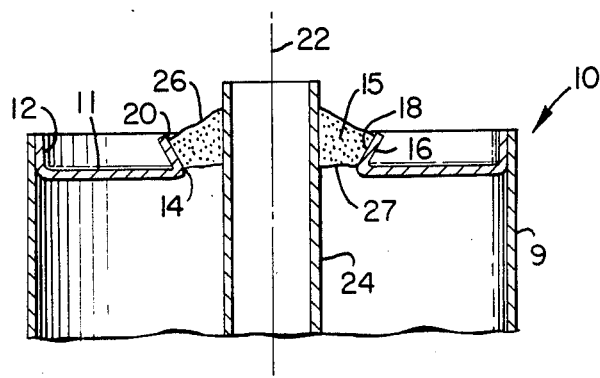
FIG. 1 is an elevation view in section showing a preferred embodiment of the present invention.

FIG. 1 shows a portion of a cell housing, generally indicated at 10, for housing an electrochemical cell system. The housing includes a container 9 which has an open end closed by a cover 11. In particular the cover has an outer peripheral skirt 12 which fits within and seals to the open end of the container 9.

The cover 11 also has an opening 14 and extending from about this opening is an inner flange 16. The flange preferably is bent from the material of the cover so that the inner peripheral surface 18 of the flange defines a passageway 15 through the cover. Opening 14 which lies in the plane of the cover is at one end of this passageway. A second opening 20 of the passageway 15 is at the end of the flange which is spaced from the plane of the cover.

As shown in FIG. 1, flange 16 is flared with respect to the longitudinal axis 22 of the passageway so that one opening of the passageway is smaller in diameter than the second opening of the passageway. In the embodiment of FIG. 1, the smaller diameter opening 14 is directed or faces toward the interior of the container to which the cover is attached. The second and larger diameter opening 20 faces toward the exterior of the container.

Protruding axially through the passageway is an electrode terminal 24. The terminal and the inner peripheral surface 18 of flared flange 16 define an annular space therebetween. This space is filled with a glass 26 which bonds the terminal to the flared flange and forms a GTM hermetic seal between the terminal and the cover. As known in the art, terminal 24 can be a hollow tube for filling the container with an electrolyte.

It has been found that the outwardly flared structure of the flared flange 16 improves the mechanical strength of the hermetic seal and allows the seal to resist a greater external force before failing. It is thought that this improved mechanical strength is the result of the flared flange exerting more of a compressive force on the glass than a conventional flange which is not flared from the longitudinal axis of opening 14.

It also has been found that a GTM seal, when used with flared flange 16, fails at a lower internal cell pressure than a GTM seal used with a conventional flange which is not flared. As mentioned hereinabove, this is desirable in order to safely release excessive internal pressures and thereby prevent disassembly of the cell components.

A build-up of pressure within the cell causes cover 11 to flex outwardly. This places the glass 26 under tension so that the GTM seal fails and/or the glass fractures from about terminal 24. Because the flange is flared outwardly, the glass is directed out of the passageway and away from the container. This insures that the glass clears from the passageway so the container vents safely.

Accordingly, it is important that the lower surface 27 of the glass 26 remains at or above the narrowest portion of passageway 15 and that it does not extend around the portion of the cover which defines openin 14. If the glass surface 27 does extend beyond the narrowest portion of the passageway, the glass can become locked in the passageway which would adversely increase the vent pressure.

As mentioned hereinabove, the angle of the flare as measured from the longitudinal axis of the passageway can be up to about 45°. An angle greater than 45° is likely to decrease the compressive force exerted by the flange on the glass and decrease the mechanical strength of the seal.

Figure 2:
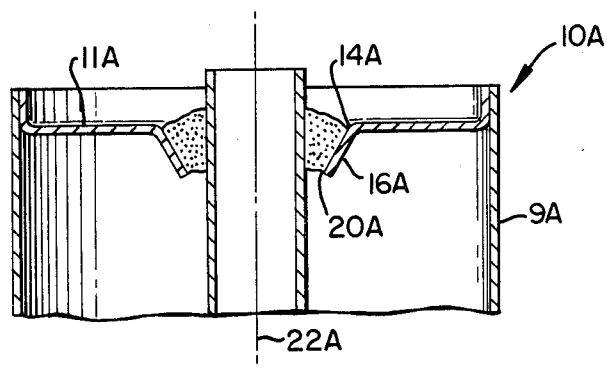
FIG. 2 is a view similar to FIG. 1 showing an alternate embodiment of the invention.

Referring to FIG. 2, a similar cover 11A is shown except that its flange 16A is bent towards the interior of housing 10A. In this embodiment the flare of flange 16A is towards the longitudinal axis 22A of cover opening 14A. This construction results in the diameter of the passageway opening 14A being larger than the diameter of the passageway opening 20A. Thus, in the FIG. 2 embodiment, the vent passage formed by flange 16A still opens outwardly from the container 9A as does the corresponding vent passage formed by the flange 16 of the FIG. 1 embodiment.

Figure 3:
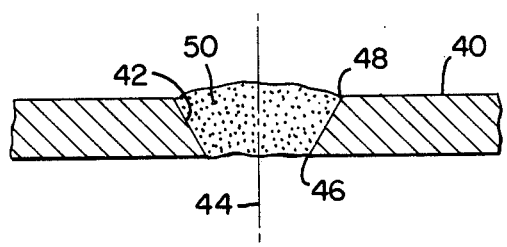
FIG. 3 shows still another embodiment.

FIG. 3 shows still another embodiment of the invention as may be used where the thickness of the cover or any other part of the housing is at least 0.015 inch. In FIG. 3, the reference 40 represents any part of the housing such as a container side wall, bottom or cover. A tapered bore extends through this part wherein the surface 42 which defines the bore is flared with respect to the longitudinal axis 44 of the passageway thereby providing a passageway opening 46 facing towards the interior of the housing which is smaller than a passageway opening 48 facing towards the exterior of the housing.

Fused within the tapered passageway is a glass 50. Due in part to the thickness of the part 40, the surface 42 provides an area sufficient for the glass 50 to form a GTM hermetic seal within the passageway.

EXAMPLE

To demonstrate the effectiveness of the present invention, containers typically used to house a $Li/SOCl_2$ cell system were each provided with a cover having an outwardly flared flange as shown in FIG. 1. Similar containers each provided with covers having a straight flange were used as controls. The containers each had an inside diameter of 0.450 inch and all containers were made from 304 stainless steel. The covers, also made of 304 stainless steel, were about 0.007 inch thick. Each cover had an outer peripheral skirt extending about 0.060 inch from the plane of the cover for attachment within the open end of the container and each cover had a central opening measuring about 0.193 inch in diameter. About the periphery of this central opening a flange extended about 0.033 inch from the plane of the cover.

Two sets of covers were made. In one set, the flange of each cover was flared at an angle of about 30° with respect to the longitudinal axis of the central opening. Covers in a second set, used as the controls, had this flange extending generally parallel to the longitudinal axis, i.e. each flange was generally perpendicular to the plane of the cover.

A 0.109 inch diameter terminal made of 446 stainless steel was bonded within the opening of each cover by a bead of a commercial borosilicate glass such as a 203 KN type glass purchased from the Glass Beads Company having the following composition by weight:

| | |
|---|---|
| $SiO_2$ | 62.7% |
| $Na_2O$ | 17.0% |
| $B_2O_3$ | 8.0% |
| $TiO_2$ | 5.0% |
| $MnO_2$ | 3.2% |
| $CaO$ | 1.6% |
| $Co_3O_4$ | 1.9% |
| $Al_2O_3$ | 0.6% |

-continued

This bead was fused about the terminal by heating to a temperature of about 950° C. to provide a GTM hermetic seal.

To determine the mechanical strength of the seal, a stream of helium was directed against the outside of the GTM hermetic seal while a spring balance applied a force axially against the external end of the terminal. A helium detector communicating with the interior of the container monitored the amount of helium leaking into the container through the seal. The applied force was increased until a helium leak rate greater than $10^{-9}$ cc/sec (STP) was detected.

Eight (8) of the control samples were tested and these withstood, on the average, an external force of about 8.3 pounds before leaking at the rate of $10^{-9}$ cc/sec. Ten (10) samples having the flared flange were tested in a similar manner and these withstood, on the average, an external force of 9.9 pounds before leaking at the same rate of $10^{-9}$ cc/sec. (STP).

These test results demonstrated that the flanges with a 30° angle of flare withstood a greater external force then the controls before a helium leak rate of greater than $10^{-9}$ cc/sec (STP) was observed.

Pressure testing also was conducted to determine the internal pressure required to cause the seals to fail. In these tests, the exterior of each seal was submerged in a low viscosity oil. The internal pressure in each container was then gradually increased until bubbles began to emanate from the seal area. This signified a slight vent. The pressure was then further increased until a blow-out of the seal occurred. A blow-out of the seal is considered to occur when the seal breaks and the terminal moves through the cover.

Six (6) control samples were tested in this fashion, and on the overage, a slight vent was detected at an internal pressure of about 148 psig and a blow out occurred about 373 psig. Thus, the pressure range between slight vent and blow out for the control samples was about 225 psig.

Five (5) samples incorporating the features of the present invention as shown in FIG. 1 were tested. On the average, a slight vent was detected in these samples at an internal pressure of about 114 psig and a blow-out of the seal occurred at an internal pressure of about 204 psig. Thus, not only did blow-out occur at a substantially lower pressure, but also the range between slight vent and blow-out was much narrower (90 psig) than for the control samples (225 psig).

The test results demonstrated that a glass-to-metal hermetic seal having a flared flange according to the present invention exhibits characteristics which are desirable in a ventable container for an electrochemical cell system. The seal is mechanically sound and able to resist externally applied forces yet it fractures responsive to an internal pressure build-up. When the seal does fracture, the angle of the flange insures that the glass will be removed from the container and provide a clear vent passage for safely venting the container.

It should be appreciated that modifications can be made in the present invention without departing from the spirit and scope of the invention as claimed. For example, rather than having a flat cover as shown, the cover can be made with a concave or convex shape. In either case the angle of the flared flange will still be between about 5° and 30°, and preferably not more than 45° as measured from the longitudinal axis of the opening through the cover.

Also, the flared flange can be incorporated into a separate part and then the part can be attached about its outer periphery over a larger opening in the cover, container side wall or container bottom. The surface area required for the GTM hermetic seal can be provided by any of the arrangements as shown in FIG. 1-3 or by superimposing two elements having a short flange extending in opposite directions. Such a structure would result from laminating the cover of FIG. 1 on top of the cover of either FIG. 2 or 3.

While a preferred range of the flare for practical reasons is described as being from about 5° to about 30°, it should be appreciated that this angle can be as little as about 1° where close tolerances are maintained in the manufacturing of the flared flange. It can be greater than about 45° if the coefficient of expansion of the glass is closely matched to the coefficient of expansion of the flared flange material surrounding the glass.

Having described the invention in detail, what is claimed as new is:

1. An electrochemical cell system disposed in a housing comprising a container having an open end closed by a cover sealed in the open end and including means for venting said housing responsive to a pressure build up within the housing comprising:
   (a) said housing including a portion having a flared flange defining a vent passageway through said housing with a first opening of said passageway facing into said housing and a second opening of said passageway facing to the exterior of said housing, said first opening being smaller than said second opening; and
   (b) an electrically insulating material hermetically sealed within said passageway.

2. An electrochemical cell system as in claim 1 wherein said flared flange upstands from said housing portion and extends outwardly of said housing.

3. An electrochemical cell system as in claim 1 wherein said flared flange depends from said housing portion and extends into housing.

4. An electrochemical cell system as in claim 1 wherein said housing portion is at least 0.015 inch thick and said flared flange is a surface which defines a tapered bore through said portion.

5. An electrochemical cell system as in claim 1, 2, 3 or 4 wherein said flared flange is flared at an angle of between about 5° and about 45° from the longitudinal axis of said passageway.

6. An electrochemical system as in claim 5 wherein said angle is between about 5° and 30° from the longitudinal axis of said passageway.

7. An electrochemical cell system as in claim 1, 2, 3, or 4 wherein said housing portion is said cover.

8. An electrochemical cell system as in claim 7 including an electrically conductive terminal extending through said vent passageway and said electrically insulating material forms a hermetic seal within said passageway between said terminal and said flared flange defining said passageway.

9. An electrochemical cell system as in claim 1 wherein said electrically insulating material is a borosilicate glass.

10. An electrochemical cell system as in claim 1 wherein said electrically insulating material is ceramic.

11. An electrochemical cell system as in claim 1 wherein said cell system is selected from the group consisting of lithium/oxyhalide, lithium/MnO$_2$, lithium/polycarbonfluoride, lithium/TiS$_2$ and lithium/SO$_2$ cell systems.

12. An electrochemical cell system disposed in a housing comprising a container having an open end, a cover hermetically sealed within said open end and means for venting said housing responsive to a pressure build up within the housing comprising:
   (a) said housing having a flared flange defining a longitudinally extending passageway through said housing;
   (b) said flared flange being flared with respect to the longitudinal axis of said passageway such that one opening of said passageway facing to the exterior of said housing is larger than a second opening of said passageway facing to the interior of said housing;
   (c) an electrically conductive terminal extending through said passageway and electrically insulated from said housing; and
   (d) a frangible electrically insulating material in said passageway which forms a hermetic seal within said passageway between said terminal and said flared flange which defines said passageway.

* * * * *